United States Patent [19]

Malizia et al.

[11] 4,446,162

[45] May 1, 1984

[54] DECAFFEINATION OF A COFFEE EXTRACT

[75] Inventors: Peter D. Malizia, Fish Kill; Jerome F. Trumbetas, Tarrytown, both of N.Y.

[73] Assignee: General Foods Corporation, White Plains, N.Y.

[21] Appl. No.: 364,111

[22] Filed: Mar. 31, 1982

[51] Int. Cl.$^3$ .............................................. A23F 5/22
[52] U.S. Cl. .................................... 426/424; 426/428
[58] Field of Search ........................ 426/424, 427, 428

[56] References Cited

U.S. PATENT DOCUMENTS 4,246,291  1/1981  Prasad et al. .................... 426/427 X

FOREIGN PATENT DOCUMENTS 1516208   6/1978   United Kingdom ................ 426/428
1532547  11/1978   United Kingdom ................ 426/428
 166486   4/1934   Switzerland .

OTHER PRIOR ART

Chemical Abstracts, 4 63 (1910), C. Kippenberger, "New Ideas on the Production of Food Low in Caffeine and Theine with a Discussion of the Patent Law of April 7, 1901".

C. Kippenberger, Neue Hinweise zur Gewinnung cofHfein—bzw. teinarmer Lebensmittel, nebst Erorterungen zum patentgesetz vom. 7 April 1891. *Zeitschrift fur angewandte Chemie,* Vol. 22, pp. 1837–1841, No. 38, September 17, 1909.

Chemical Abstracts 38 5608 (1944), Luiz Ribeiro Guimaraes, "The Solubility of Caffeine in Coffee Oil", Rev. guim. ind., (Rio de Janeiro) 13, No. 143, 26 (1944).

Luiz Ribeiro Guimaraes, "Solubilidade da cafeina no oleo de cafe", Revista de Quimica Industrial, March 1944, p. 26

OTHER PUBLICATIONS

Sivetz, Coffee Origin and Use, 1973, Coffee Publications: Corvallis, Oregon, FIG. 8-26.

*Primary Examiner*—Joseph M. Golian
*Attorney, Agent, or Firm*—T. V. Sullivan; R. L. Crisona; T. R. Savoie

[57] ABSTRACT

A process for decaffeinating and aqueous coffee extract involves contacting the extract with a fatty solvent while concurrently vacuum distilling a portion of the water initially present from the aqueous coffee extract and subsequently separating the decaffeinated coffee extract and the caffeine-containing fatty solvent.

6 Claims, No Drawings

DECAFFEINATION OF A COFFEE EXTRACT

TECHNICAL FIELD

The present invention relates to a process for decaffeinating aqueous coffee extracts. More particularly, the process involves contacting the coffee extract with a fatty solvent while concurrently vacuum distilling a portion of the water initially present from the aqueous coffee extract. The caffeine-containing fatty solvent is subsequently separated from the decaffeinated coffee extract.

BACKGROUND ART

One well-known method of decaffeination is disclosed in U.S. Pat. No. 2,309,092 to Berry et al. wherein caffeine is extracted from green coffee beans by contact with an aqueous extract of green coffee solubles. The caffeine-laden solution is stripped of caffeine by subsequent contact with a halogenated organic solvent such as methylene chloride. Another predominant decaffeination method involves contacting the green coffee beans directly with a halogenated organic solvent as described in U.S. Pat. No. 3,671,263 to Patel et al.

The industry has long desired to eliminate contact of such halogenated organic solvents with either the coffee beans or an extract directly contacting the coffee. Recent disclosures describe processes using caffeine adsorbents for removing the caffeine from a solution of green coffee solubles. For instance, European Pat. App. Ser. No. 79102822.8/Document No. 0,008,398 discloses using a treated activated carbon as the caffeine adsorbent. A polymeric resin caffeine adsorbent is disclosed in U.S. Pat. No. 4,031,251 to Margolis. While both types of adsorbents might be somewhat effective, they are not without certain drawbacks, such as the inability to efficiently recover the caffeine removed from the coffee extract.

Another approach to eliminating the use of halogenated organic solvents in a decaffeination process is disclosed in U.K. Pat. No. 1,516,208 wherein a liquid water-immiscible fatty material is used to recover caffeine from a vegetable extract. The solubility of caffeine in the fatty materials disclosed therein is generally low, indicating the relative inefficiency of such a process. An improvement to the process described in U.K. Pat. No. 1,516,208 is disclosed in U.K. Pat. No. 1,532,547 wherein a method of recovering caffeine from the fatty material subsequent to decaffeination of the extract is described. The improvement does not relate to the decaffeination portion of the operation.

It is an object of the present invention to provide a decaffeination process that does not involve the use of a halogenated organic solvent.

It is a further object of the present invention to provide a decaffeination process using a fatty solvent, which process is more efficient than processes heretofore disclosed by the art.

DISCLOSURE OF THE INVENTION

It has now been discovered that the objects of the present invention are met by a decaffeination process which involves contacting a coffee extract with a fatty solvent while concurrently vacuum distilling a portion of the water initially present from the aqueous coffee extract. The decaffeinated coffee extract is subsequently separated from the caffeine-rich fatty solvent, which solvent may be treated and returned to the process as essentially fresh fatty solvent.

The term "fatty solvent" is intended to refer to those fatty solvents which are immiscible in an aqueous coffee extract and which solvents are recognized as safe for food processing. A typical vegetable oil such as corn oil, soybean oil, cottonseed oil or safflower oil is suitable. So too, deodorized and clarified coffee oil is suitable for meeting the objects of the present invention. Coffee oil has the advantage of being derived from coffee whereas the other oils derive from other vegetable sources or perhaps even animal sources.

As hereinabove mentioned, vacuum distillation of the aqueous coffee extract is concurrent to the contact of said extract and the fatty solvent. It has been found that the distillation should be carried out at a pressure less than 500 mm Hg, with a pressure less than 250 mm Hg being particularly convenient. The temperature at which the contact and concurrent distillation take place is fixed by the pressure selected, with a higher temperature being required when a pressure towards the upper limit is used. It is preferable to operate the process at as low a pressure as practical, corresponding to a relatively lower temperature, because the efficiency of the present invention is greatly improved at such temperatures. The increased efficiency results from the lesser solubility of caffeine in water at decreased temperature.

There is some flexibility in selecting the level of vacuum distillation to which the coffee extract is subject. The greatest efficiency is achieved if said extract is distilled from about 25% by weight coffee solids initially to about 90% by weight coffee solids; this is particularly true where the temperature is greater than 50° C. At relatively lower temperatures (which require suitably low pressures), it may be possible to subject the coffee extract to less vacuum distillation yet still achieve the same efficiency of decaffeination.

The aqueous coffee extract may be contacted with the fatty solvent in any vessel which both provides for liquid-liquid contact and is capable of maintaining a reduced pressure. A batch-wise scheme wherein the two components are contacted in a sealed vessel under a vacuum is one possibility. So too, the coffee extract and fatty solvent may be contacted in a continuous liquid-liquid column, which column operates under a vacuum and is capable of the heat input necessary for the concurrent vacuum distillation of the extract. The temperature and pressure at which said contact takes place are the values selected for the concurrent vacuum distillation.

A major advantage of the present invention is the efficiency of the decaffeination as reflected by the ratio of the weight of fatty solvent contacted to the weight of aqueous coffee extract decaffeinated. It is desirable to minimize the amount of fatty solvent used and the size of the equipment required for carrying out the invention. In a departure from prior art, it has been found that greater than 90% by weight decaffeination of an aqueous coffee extract may be achieved with a weight ratio of approximately 15 gm of fatty solvent/gm of aqueous extract (initial concentration is 25% by weight coffee solids). Manipulation of said ratio in the present invention will provide a greater degree of decaffeination as desired.

Under certain circumstances, it may be more convenient to operate this invention in stage-wise fashion to achieve the required level of decaffeination. The preferred stage-wise scheme is to contact the fatty solvent with the coffee extract while concurrently vacuum distilling said extract from about 25% by weight coffee solids to about 90% by weight solids. The concentrated partially decaffeinated coffee extract is diluted to about 25% by weight coffee solids and contacted with fresh fatty solvent in the next stage. The water used for diluting the partially decaffeinated coffee extract is preferably the condensed water collected during the vacuum distillation of the previous stage. Though other stage-wise schemes may be used, the one disclosed herein is preferred because it provides for concurrent contact of the components and vacuum distillation in each stage. The value of the vacuum distillation in each stage lies in the increasing concentration of caffeine in the coffee extract as water is distilled therefrom. Caffeine is transferred to the fatty solvent in order to establish a new equilibrium as said concentration increases in the distilling coffee extract.

Once there has been sufficient contact and vacuum distillation by batch-wise, stage-wise or continuous operation, the caffeine-containing fatty solvent is separated from the decaffeinated coffee extract. The coffee extract at about 90% by weight coffee solids is diluted to between 20% by weight and 40% by weight solids and returned to the coffee process. Caffeine may be removed from the fatty solvent by vacuum steam stripping as disclosed in U.K. Pat. No. 1,532,547, or the caffeine may be recovered by simple water washing. The essentially caffeine-free fatty solvent is then recycled back to the decaffeination operation.

The present invention may be used to decaffeinate an extract of green or roasted coffee. A green coffee extract decaffeinated by the present invention may preferably be one as is used in the Berry et al. disclosure hereinbefore discussed. It may also be desirable to decaffeinate a roasted coffee extract during the processing of the extract into a decaffeinated soluble coffee. In view of the vacuum distillation though, it is preferable to strip the flavor and aroma constituents from such a roasted coffee extract prior to decaffeination. Said aroma and flavor constituents may then be returned to the decaffeinated coffee extract.

The following examples are intended to demonstrate certain embodiments of the present invention. The examples are not meant to limit the invention beyond what is claimed below.

EXAMPLE 1

1. 200 gm of green coffee extract (0.57% by weight caffeine and about 25% by weight coffee solids) are mixed with 1000 gm of partially hydrogenated and winterized soybean oil (sold under the brand name of Wesson Oil).

2. The mixture was placed in a Roto film Evaporator (supplied by Arthur F. Smith Co. of Rochester, N.Y.) at a pressure of about 230 mm Hg and a temperature between 70° C. and 75° C. until about 90% by weight of the water initially present had been distilled from the coffee extract, this taking about two hours. The evolving water was collecting as a distillate.

3. The components were allowed to separate and were then separately decanted off. Small samples of the edible oil and coffee extract were retained for analysis.

4. The green coffee extract was diluted to a concentration of about 25% by weight coffee solids, using the distillate collected from Step 2.

5. Steps 1–4 were repeated twice more, using 1000 gm of fresh edible oil for each stage. The results are summarized in the table below.

TABLE

| Stage | % Overall Decaffeination |
|---|---|
| 1 | 61.3 |
| 2 | 86.5 |
| 3 | 91.8 |

EXAMPLE 2

Roasted coffee extract (2.9% by weight caffeine and 20.0% by weight coffee solids) was contacted with partially hydrogenated soybean oil (sold under the brand name of Wesson Oil) at a weight ratio of 50 oil/1 coffee extract. The two liquids were contacted under moderate agitation at 80° C. for a period of 45 minutes and then separated for analysis. Only 45% by weight decaffeination of the coffee extract was achieved.

This example demonstrates the value of the concurrent vacuum distillation step. Here, in excess of 3 times the amount of oil was used but the level of decaffeination was only about half that of Example 1.

We claim:

1. A process for decaffeinating an aqueous coffee extract which comprises contacting said extract containing about 25% by weight coffee solids with a fatty solvent while concurrently vacuum distilling a portion of the water initially present from the aqueous coffee entract until the extract contains about 90% by weight coffee solids and subsequently separating decaffeinated coffee extract and caffeine-containing fatty solvent.

2. The process of claim 1 wherein the concurrent contact of the coffee extract with the fatty solvent and the vacuum distillation of the water from said extract is carried out at a pressure less than 500 mm Hg.

3. The process of claim 1 wherein the fatty solvent is selected the group including corn oil, soybean oil, safflower oil, cottonseed oil and coffee oil.

4. The process of claim 1 wherein the aqueous coffee extract is an extract of green coffee.

5. The process of claim 1 wherein the aqueous coffee extract is an extract of roasted coffee.

6. A stage-wise process for decaffeinating an aqueous coffee extract which comprises:
   (a) contacting the coffee extract containing about 25% by weight coffee solids with a fatty solvent while concurrently vacuum distilling a portion of water initially present from the coffee extract until the extract contains about 90% by weight coffee solids;
   (b) collecting the evolving water vapor as a distillate during vacuum distillation;
   (c) subsequently separating partially decaffeinated coffee extract and caffeine-containing fatty solvent;
   (d) diluting the partially decaffeinated coffee extract from (c) with the distillate obtained in (b); and
   (e) repeating steps (a) through (d) until the desired level of decaffeination is achieved.

* * * * *